(No Model.)
W. D. GUSEMAN.
BROADCAST SEED SOWER.
No. 402,822. Patented May 7, 1889.
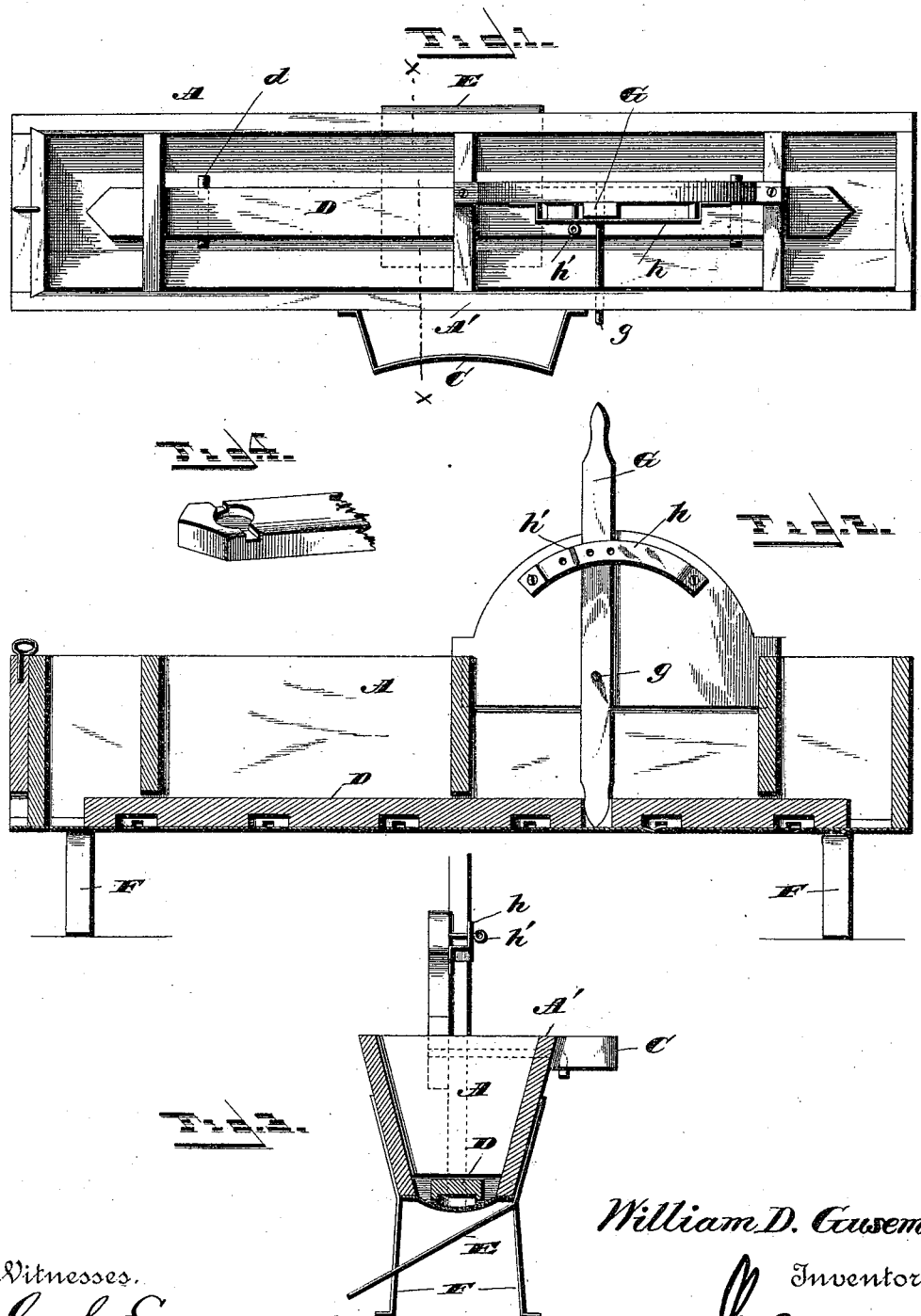
Witnesses.
G. S. Elliott.
E. W. Johnson.
William D. Guseman
Inventor
By his Attorney

UNITED STATES PATENT OFFICE.

WILLIAM D. GUSEMAN, OF MORGANTOWN, WEST VIRGINIA.

BROADCAST SEED-SOWER.

SPECIFICATION forming part of Letters Patent No. 402,822, dated May 7, 1889.

Application filed February 28, 1889. Serial No. 301,469. (No model.)

*To all whom it may concern:*

Be it known that I, WILLIAM D. GUSEMAN, a citizen of the United States of America, residing at Morgantown, in the county of Monongalia and State of West Virginia, have invented certain new and useful Improvements in Broadcast Seed-Sowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in broadcast seed-droppers adapted to be carried and operated by a person; and my invention consists in the construction and combination of the parts, as will be hereinafter fully set forth, and specifically pointed out in the claims.

The main object of this invention is to provide a seed-dropper with a screen or shield located in front of the operator to prevent the seed falling upon his feet and legs, and also to provide the frame with light legs, upon which it may be supported when not in use.

In the accompanying drawings, Figure 1 is a plan view of a seed-dropper constructed in accordance with my invention. Fig. 2 is a longitudinal sectional view. Fig. 3 is a transverse sectional view taken through the line $x$ $x$ of Fig. 1. Fig. 4 is a detail view of one of the ends of the seed-slide.

The seed-box A, slide D, and lever for operating the seed-slide are constructed substantially as shown in Patent No. 104,302, dated June 14, 1870, and my present invention is designed more especially as an improvement upon the aforesaid patent, and it is intended, by adding the hereinafter specified improvements thereto, to provide a seed-dropper which will have certain advantages over this patent.

To the rear side, A', of the box A, I attach a metallic bail, C, which is curved and bears against the body of the operator to locate the hopper a little in advance thereof. Directly beneath this bail C, I rigidly secure near the lower edge of the hopper a plate, E, which is bent beneath the hopper to project the forward end thereof in front of the seed box or hopper, so that the seed which falls upon the same when the seed-slide is reciprocated will be discharged at a considerable distance in front of the operator, so as not to fall upon his feet or legs, which would render the planting uneven.

The seed-slide D may be provided near its ends, or at intervals, with projecting cross-pieces $d$, which will not only serve as stirrers, but will also prevent the seed-slide warping, these cross-pieces also serving to keep the openings beneath the partitions clear. The bent plate E only extends laterally beneath the seed box or hopper A sufficient to occupy the space taken up by the operator.

Near the ends of the box are secured light metallic legs or feet F, the upper ends of which are secured to the sides of the hopper, while the lower ends are bent outwardly to provide a larger bearing-surface. These legs form a support for the hopper when not in use and prevent the plate E being bent, as well as the seed-slide being obstructed by earth should the device be placed upon the ground in the field.

I am aware that end supports for a broadcast seed-dropper are not broadly new, as they are shown in Patent No. 81,942, dated September 8, 1868; but said supports are formed with the ends of the seed-box, and are heavy and objectionable as adding unnecessary weight.

The operating-lever G is pivoted upon a pin, $g$, directly over the seed-slide, and the upper portion of this lever passes beneath a segmental plate, $h$, which is provided with perforations, through which passes a pin, $h'$, for limiting the play of the lever.

Having thus described my invention, what I claim as new, and desire to secure by Letters Patent, is—

1. The combination, in a broadcast seeder or dropper adapted to be carried by the operator, a plate, E, secured to the seed-box, said plate being bent to project the forward end thereof in front of the hopper, substantially as shown and for the purpose set forth.

2. The combination, in a seed-dropper, of a seed box or hopper and means for operating the seed-slide, a bail, C, attached near the upper end of the seed-box, an inclined plate, E, attached to the seed-box beneath the bail C, said plate E being bent to project the forward end thereof in front of the seed-box, and legs F F, attached near the ends of the seed-box, said legs having outwardly-turned feet, the parts being organized substantially as shown and for the purpose set forth.

In testimony whereof I affix my signature in presence of two witnesses.

WILLIAM D. GUSEMAN.

Witnesses:
GEO. C. BAKER,
I. G. LAZZELL.